Aug. 21, 1934.   R. DE O. McDILL   1,970,613
METHOD OF CONTROLLING TREATING PROCESSES
Filed Sept. 27, 1930

Inventor
Rex De Ore McDill
By Lyon & Lyon
Attorneys

Patented Aug. 21, 1934

1,970,613

UNITED STATES PATENT OFFICE 1,970,613

METHOD OF CONTROLLING TREATING PROCESSES

Rex De Ore McDill, Los Angeles, Calif., assignor to Food Machinery Corporation, San Jose, Calif., a corporation of Delaware Application September 27, 1930, Serial No. 484,927

3 Claims. (Cl. 99—11)

This invention pertains to a method of controlling processes which include the treatment of fluids. The invention also relates to an apparatus whereby the treatment of fluids may be readily and automatically controlled.

In many processes involving the treatment of fluids, and particularly liquids, suspensions and colloidal solutions, changes take place in such fluids, solutions and suspensions at critical stages in the process. This invention is particularly directed to a method by means of which the processing of the fluid, suspension or solution is automatically controlled by reason of some change in the character of the fluid, suspension or solution being treated.

The processing of the fluid, solution or suspension may assume a number of different forms. The processing may include evaporation, distillation, concentration, mixing, dewatering, heat treatment or subdivision of the suspended material.

The physical changes occurring in the fluid, solution or suspension being processed may include changes in consistency, changes in viscosity, concentration or density. The method of this invention is particularly applicable to the control of those processes which occasion changes in consistency, density, concentration or viscosity; such changes being accompanied preferably by changes in opacity, translucence or color of the fluid, liquid, solution or suspension being processed. Furthermore, the change in the liquid being processed may be accompanied by a change in the ability of the liquid to transmit light or to absorb a greater quantity of light, or by a change in the quantity of light rays of different wave lengths which may be absorbed by the liquid.

An object of this invention is to disclose and provide a method of regulating and controlling processes which include the treatment of liquid, solutions and suspensions.

A further object is to disclose and provide a method of controlling the consistency of liquids, solutions and suspensions being processed.

Another object is to disclose and provide a process for controlling the consistency of a flowing liquid containing light penetrable solids in suspension.

A still further object is to disclose and provide a method of controlling the processing of fluid substances whose consistency, density, concentration or viscosity changes are accompanied by changes in opacity, translucence or color.

An object of the invention is to disclose and provide a method whereby the processing of a liquid, suspension or solution may be automatically controlled, whenever the physical characteristics of the liquid being processed reach a predetermined condition.

An object of the invention is to disclose and provide means whereby the consistency of liquids, suspensions or solutions may be readily controlled.

Another object is to disclose and provide means whereby a flowing stream of liquid, solution or suspension may be tested during processing and said processing regulated in accordance with the physical changes imparted to the liquid, suspension or solution by such processing.

Another object is to disclose and provide means whereby a flowing stream of liquid, solution or suspension being processed may be subjected to penetrating rays and the processing of said solution, suspension or liquid regulated automatically by the opacity or translucence of the liquid, solution or suspension to such penetrating rays.

From the hereinabove general description it will be apparent that the method of this invention is applicable to a great number of industrial operations involving the processing of fluids, liquids, suspensions or solutions, and, therefore, for purposes of simplicity and ease in understanding the invention will be particularly described as it pertains to the control of processes of producing food products such as, for example, catchup and tomato puree. Furthermore, in describing the invention reference will be had to the appended drawing showing one form of means whereby the invention may be placed in operation.

As stated hereinabove, the invention will be described as it particularly pertains to the treatment of food products, and specifically the treatment of tomatoes for the manufacture of tomato puree therefrom.

The processing of tomatoes in the manufacture of tomato puree includes as an important step thereof the step of cooking particles of tomatoes suspended in an aqueous liquid until the mass is reduced to a desirable consistency. The step of cooking tomatoes for the manufacture of tomato puree, although apparently simple, involves a very careful control as the consistency of the mixture changes rapidly toward the end of the concentrating or cooking operation. A difference of but a few minutes may result in an over-cooked, extremely dense mass having an undesirably dark color and a flat, cooked taste. In view of the difficulties hitherto encountered in the manufacture of tomato puree, this particular process has been picked out as an illustrative example of this invention.

Figure 1:
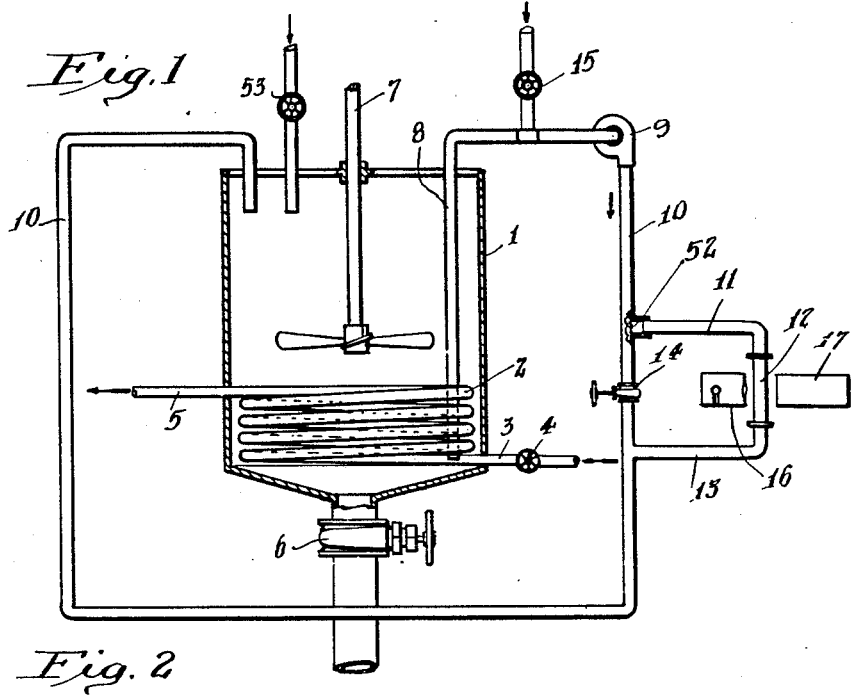
Fig. 1 is a diagrammatic illustration of one arrangement of elements in which a part of the process and its control may be carried out in accordance with this invention.

As shown in Fig. 1, the tomato pulp may be placed in a suitable vessel 1 provided with means for supplying heat thereto, as for example, a steam coil 2 having an inlet line 3 provided with a valve 4 and an outlet line 5. The tank or vessel 1 may be provided with a conical bottom and a valve discharge line 6 leading therefrom; any suitable form of agitator may be employed, as for example, the agitator and shaft 7.

In order to facilitate circulation and agitation of the tomato pulp within the cooking vessel 1, a pipe line 8 may lead from a point near the bottom of the vessel 1 to a pump 9.

The pump 9 may discharge through line 10 into the upper portion of the tank 1. A branch line 11 may lead off from the line 10, said line 11 being connected with a cell 12, said cell 12 being in turn connected again with line 10 as by means of the line 13. A suitable valve 14 may be positioned in the line 10 between those points at which lines 11 and 13 leave and return to the line 10. The cell 12 may be of any desired shape or size and preferably contain a portion made of glass, quartz, fused silica or other substantially transparent material. Conveniently, the transparent portion of the cell 12 may comprise two opposite windows of transparent material, the windows being parallel to each other and plane. A valved flushing line 15 may lead into the inlet line 8 to which the pump is connected.

Figure 2:
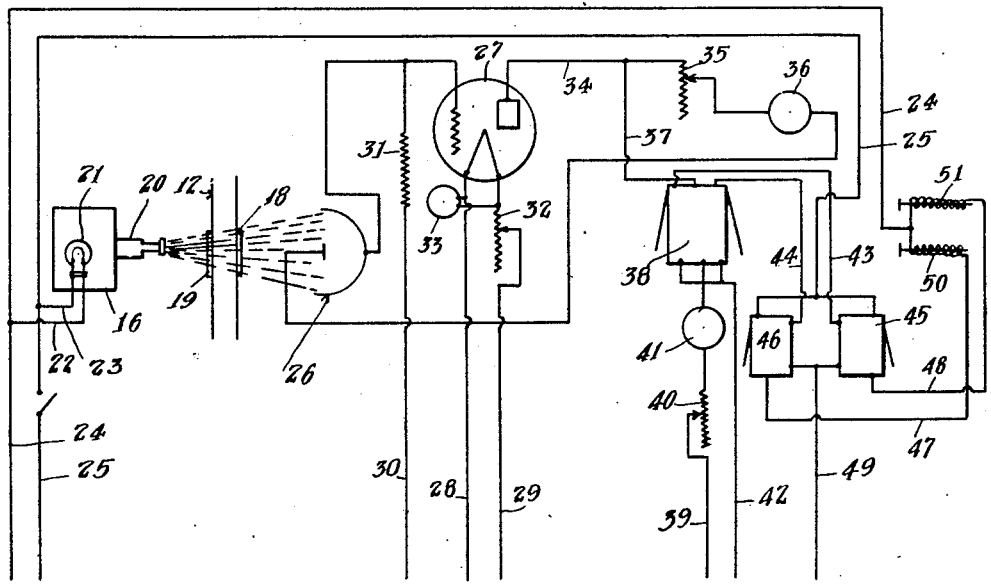
Fig. 2 is a wiring diagram of certain portions of the apparatus adapted to carry out the invention.

The apparatus adapted to automatically control the treatment of tomato pulp in the tank 1 may include a projector 16 and a photoelectric device diagrammatically illustrated at 17 in Fig. 1, said projector 16 and photoelectric device 17 being placed in operative relation with the testing cell 12. One form of photoelectric device adapted to be employed is shown in Fig. 2. The cell 12 is diagrammatically illustrated in Fig. 2 as merely a conduit provided with transparent windows 18 and 19. The projector 16 may include any suitable lens mount 20 and a source of light or other penetrating ray such as the lamp 21. When an ordinary incandescent lamp is employed it may be supplied with electrical energy by means of leads 22 and 23 from the power supply lines 24 and 25.

The photoelectric cell 26 may be connected to a suitable amplifier. For purposes of illustration the amplifier shown in Fig. 2 includes a thermionic valve 27, the filament thereof being provided with suitable current by the leads 28 and 29. A negative grid bias may be supplied by the lead 30 having a resistance 31 inserted therein. A variable resistance 32 may be inserted in the filament circuit of the thermionic valve 27 and a volt meter 33 may be placed across the leads 28 and 29 leading to the filament of the valve 27.

The lead 34 connected to the plate of the thermionic valve 27 may have a potentiometer or variable resistance 35 inserted therein as well as a milliammeter 36. Lead 37 may connect the output of the amplifier tube 27 with a relay 38 supplied with electrical energy through a lead 39 having a variable resistance 40 and a milliammeter 41. Relay 38 may also be supplied with electrical energy from a lead 42.

The relay 38 may be of the double-throw type adapted to be closed whenever the current supplied thereto by the line 37 either exceeds or falls below certain predetermined quantities. For this reason the relay 38 may be connected as by means of leads 43 and 44 with two relays 45 and 46. The relays 45 and 46 may be, respectively, low and high relays of a single-throw type. The relay 45 will be actuated whenever the relay 38 is closed because the current supplied thereto falls below a certain predetermined quantity, whereas the relay 46 will be actuated whenever the current supplied to the relay 38 exceeds a certain predetermined quantity.

The relays 45 and 46 may be supplied with electrical energy as by means of the line 25, the circuit being closed by means of leads 47 and 48 leading to suitable solenoids 50 and 51, respectively. The circuit may be completed by means of the line 24 connected to a point between the solenoids 50 and 51. In addition, the relays 45 and 46 may be supplied with a current of lower voltage than that supplied by leads 24 and 25 as, for example, by means of the line 49.

In general, the lines 24, 25 may supply alternating current to, say 110 volts potential and when the thermionic valve 27 is of the type known as 312—A, the resistance 31 may be of the order of 60 megohms, the variable resistance 32 of 6 ohms, the potentiometer 35 of the order of 10,000 ohms, and the variable resistance 40 of the order of 50,000 ohms. The negative grid bias supplied by line 30 may be negative 45 volts and the positive B potential supplied by line 39 may be 135 volts. The lines 42 and 49 may supply a current at about 45 volts potential. It is to be understood that these specific figures are merely given for purposes of illustration, it being understood that any one skilled in the art will be able to adjust the values as well as the arrangement of elements without deviating from the spirit or scope of this invention.

In operation, the fluid being treated, such as the tomato paste, being circulated through the lines 8, 10, 11, the cell 12 and line 13 by means of the pump 9, is subjected to a light of substantially constant penetrating ray, such as a light ray emitted by the light source 21, said light rays passing through the cell 12 and the tomato paste moving therein. A part of the light will become absorbed by the tomato paste which contains material in suspension and is of a characteristic color; the remainder of the light rays will penetrate the body of tomato paste in the cell 12 and will energize the photoelectric cell 26, giving rise to an electric current which is amplified in any suitable manner, as for example, by the thermionic valve 27. This amplified electrical energy then controls the operation of the relay 38.

In the specific illustration to which the hereinabove description has been applied, namely, tomato paste or tomato puree, the milliammeter responses when an incandescent light is employed may run somewhat as follows: If the solution passing through the test cell 12 contains 50% tomato paste, the milliammeter 36 may show a reading of 17.5; as the concentration of the fluid passing through the test cell 12 increases, greater quantities of light will become absorbed by the fluid, thereby causing a reduction in the milliammeter readings.

For example, at 80% concentration the reading on the milliammeter 36 will drop to about 12 milliamperes; at 90% concentration the reading will be only about 9.5 milliamperes and at 100% concentration the reading on the milliammeter 36 will be about 7 milliamperes. By 100% concentration reference is made to a tomato paste or tomato puree of a desired consistency, 50% concentration referring to a tomato paste containing substantially 50% water or juice which is evaporated or concentrated during treatment.

The relays 38 and 45 may be said to operate when the milliammeter response as represented by the milliammeter 36 drops to 7 milliamperes or slightly thereabove. Whenever the output of the photoelectric cell circuit drops to say 7.5 milliamperes, the light relay 38 will close on the low side, thereby energizing the low relay 45 which in turn closes the main circuit, causing current to flow through the solenoid 51. The solenoid 51 may be caused to actuate the valve 4, thereby discontinuing the admission of steam to the heating coil 2 within the tank 1, thus terminating the concentration or cooking of the tomato paste in the vessel 1.

Inasmuch as a certain amount of heat will remain in the coils 2, the relays 38 and 45 may be adjusted to operate at 7.5 milliamperes instead of 7, so that the additional after-cooking caused by the residual heat in the coils 2 will not overcook the tomato paste in the vessel 1, although as stated hereinabove in the illustrative example given, 100% tomato paste gives a reading of 7 milliamperes and not 7.5.

The connection between the valve operating solenoid 51 and the valve 4 need not be described in detail, as electrical means for operating valves are known in the art and any electrical means for operating the valve 4 or other suitable valve in the system may be substituted for the solenoids particularly shown. In addition to automatic actuation of the valve 4, the closing of the relay 45 may simultaneously close the circuit leading to a signal bell or light, so as to visually or audibly notify the operators that the processing of the fluid in the tank 1 has reached completion.

Although in the example given hereinabove the treating agent supplied to the vessel 1 consisted of steam or other source of heating fluid, it will be understood that the method of this invention and the apparatus adapted to carry out said method is applicable to other instances in which a different treating agent is employed. For example, the vessel 1 may be merely a mixing vessel supplied with the material to be treated through one inlet, and with another substance or treating agent through another inlet. The proportion of the treating agent continuously added to the liquid being treated may be regulated in much the same manner as described hereinabove.

At the completion of a run, after the tomato pulp has been withdrawn from the vessel 1 through the valve outlet 6, cleaning fluid such as water may be admitted through the valved inlet 15 and circulated through the entire system so as to remove any residue.

In this connection, attention is drawn to the fact that when tomato pulp or other substance containing large particles in suspension is to be tested and controlled during processing, it may be advisable that the cell be supplied with a portion of the fluid from which the major proportion of large suspended particles has been removed. It is for this reason that the outlet line 10 from the circulating pump 9 is branched and the test cell 12 placed in the branch 11. A screen such as the screen indicated at 52 may be positioned between the line 10 and the branch line 11 leading to the test cell 12, thus causing the large suspended particles of tomato paste to be retained in the line 10 and only the fine suspended particles and liquid constituents passed through the test cell 12. The valve 14 may be adjusted so as to cause a desired proportion of the liquid to pass through the test cell.

Furthermore, the controlling process as well as the treating process may be continuous in operation; the tomato paste for example may be continuously introduced through a valved inlet 53 and continuously withdrawn through the valved outlet 6. The treating agent, such as steam in the present instance may be admitted to the valved line 3.

The low relay 45 and the solenoid 51 related thereto can be caused to actuate the valve 6, whereas the high relay 46 and its related solenoid 50 may be caused to either close or throttle the valve 53, or close or throttle the outlet valve 6. By merely duplicating relays and valve actuating means energized by the closure of said relays, the entire process may be made continuous so that the fluid to be treated, such as tomato paste, may be continuously introduced into the treating vessel 1 and the treated fluid withdrawn continuously from the vessel, while a treating agent such as heat or heating fluid is continuously supplied to the treating vessel. The rate of fluid supply treated, fluid output, or the rate at which the treating agent is supplied to the treating vessel is controlled and regulated by the consistency or light absorbing characteristics of the fluid being circulated through the test cell 12.

Under certain circumstances it may be advisable not to employ a substantially white light in the projector 16, but instead employ some other penetrating ray or band of rays. For example, it may be desirable to employ color filters in the projection system 16 to eliminate variation of result arising by reason of the absorption of light by fluids of varying color. Furthermore, if the liquid contains light ray penetrable solids in suspension, the characteristic color of the light absorbed by such solids may be filtered out before projecting the light through the solids.

In the case of tomato paste it has been found that the sensitivity of the instruments and of the method is increased by using a blue filter. Similarly, ultra-violet or other penetrating rays may be employed instead of the visible light rays.

The application of the method of this invention to a food product such as tomato paste has been selected for purposes of illustration because hitherto it has been impossible to determine the proper consistency of the product except by eye, by unit weight or by means of a hydrometer. By the use of the method of this invention, however, the heretofore indefinite and cumbersome methods have been obviated.

The method and apparatus of this invention are not limited, however, to the treatment of food products; instead the invention is applicable to a great number of materials under a great variety of treating conditions. Not only is the method applicable to processes in which fluids are heated, concentrated or crystallized, but even to processes in which precipitates or suspensions are formed or as by mixing two ingredients. Paper pulp, lacquer, varnishes, condensed milk, magnesium carbonate suspensions, rayon, chocolate and other materials are subject to the controlling method described hereinabove.

Under certain conditions it is desirable that a standard cell be used in connection with the test cell, the two cells being in operative relation to photoelectric cells, each of which is in one leg of a potential bridge circuit. If the processing system is only a batch system then the relay will throw or close when the test and standard cells give the same readings and the electrical potential bridge is balanced. These and other adaptations of the method of this invention will be readily appreciated by those skilled in the art and, therefore, a detailed description of such modifications will not be given here. All such modifications and changes as come within the scope of the appended claims are embraced thereby.

I claim:

1. A method of continuously controlling the cooking of tomato puree which comprises: continuously introducing tomato puree into a cooking zone; continuously discharging treated tomato puree from said zone; separately and continuously recirculating the puree from and into the cooking zone through a testing zone; subjecting the current of puree during such recirculation to the action of a penetrating light ray; measuring the intensity of light rays transmitted through such current of puree; and varying the quantity of puree in such cooking zone in accordance with the measured quantity of light rays transmitted through said current of puree.

2. A method of continuously controlling the cooking of tomato puree which comprises: continuously introducing tomato puree into a cooking zone; continuously discharging treated tomato puree from said zone; separately and continuously recirculating the puree from and into the cooking zone through a testing zone; subjecting the current of puree during such recirculation to the action of a penetrating light ray; measuring the intensity of light rays transmitted through such current of puree; and varying the rate of continuous discharge of treated puree from said cooking zone in accordance with the measured quantity of light rays transmitted through said current of puree.

3. A method of continuously controlling the cooking of tomato puree which comprises: continuously introducing tomato puree into a cooking zone; continuously discharging treated tomato puree from said zone; separately and continuously recirculating the puree from and into the cooking zone through a testing zone; subjecting the current of puree during such recirculation to the action of a penetrating light ray; measuring the intensity of light rays transmitted through such current of puree; and varying the rate of continuous feed of tomato puree into said cooking zone in accordance with the measured quantity of light rays transmitted through said current of puree.

REX DE ORE McDILL.